US010650094B2

(12) United States Patent
Maneriker et al.

(10) Patent No.: US 10,650,094 B2
(45) Date of Patent: May 12, 2020

(54) PREDICTING STYLE BREACHES WITHIN TEXTUAL CONTENT

(71) Applicant: ADOBE INC., San Jose, CA (US)

(72) Inventors: Pranav Ravindra Maneriker, Bangaluru (IN); Anandhavelu Natarajan, Bangaluru (IN); Vivek Gupta, Jammu (IN); Basava Raj K, Visakhapatnam (IN)

(73) Assignee: Adobe Inc., San Jose, CA (US)

(*) Notice: Subject to any disclaimer, the term of this patent is extended or adjusted under 35 U.S.C. 154(b) by 93 days.

(21) Appl. No.: 15/812,632

(22) Filed: Nov. 14, 2017

(65) Prior Publication Data

US 2019/0147034 A1    May 16, 2019

(51) Int. Cl.
*G06F 17/24* (2006.01)
*G06F 17/27* (2006.01)
*G06N 10/00* (2019.01)
*G06N 5/02* (2006.01)
*G06N 20/00* (2019.01)

(52) U.S. Cl.
CPC .......... *G06F 17/274* (2013.01); *G06F 17/241* (2013.01); *G06F 17/277* (2013.01); *G06F 17/2775* (2013.01); *G06N 5/022* (2013.01); *G06N 20/00* (2019.01)

(58) Field of Classification Search
CPC .... G06F 17/274; G06F 17/241; G06F 17/277; G06N 20/00; G06N 5/022
See application file for complete search history.

(56) References Cited

U.S. PATENT DOCUMENTS

| | | | | |
|---|---|---|---|---|
| 2005/0257140 A1* | 11/2005 | Marukawa | ............ | G06F 17/218 715/255 |
| 2012/0310627 A1* | 12/2012 | Qi | ........................ | G06F 17/2785 704/9 |
| 2016/0124944 A1* | 5/2016 | Andreoli | ............. | G06F 17/2854 704/2 |
| 2017/0109326 A1* | 4/2017 | Tan | ........................ | G06F 17/218 |
| 2018/0114116 A1* | 4/2018 | Liang | ................... | G06N 3/0454 |
| 2018/0267950 A1* | 9/2018 | de Mello Brandao | | G06F 17/248 |
| 2019/0050388 A1* | 2/2019 | Eugster | ................. | G06F 17/278 |

OTHER PUBLICATIONS

Graham et al., Segmenting documents by stylistic character:, Mar. 2004, all (Year: 2004) (Year: 2004).*
Zheng et alA Framework for Authorship Identification of Online Messages: Writing Style Features and Classification Techniques, 2005, Wiley (Year: 2005) (Year: 2005).*

(Continued)

*Primary Examiner* — Sonia L Gay
(74) *Attorney, Agent, or Firm* — Shook, Hardy & Bacon, L.L.P.

(57) ABSTRACT

Embodiments of the present invention provide systems, methods, and computer storage media directed to facilitating predicting style breaches within content. In one embodiment, target content for which style breach prediction is desired is obtained. Style features associated with the target content are identified. Such style features and a style breach prediction model are used to predict a style breach within the target content, the style breach indicating a change of style used within the target content (e.g., a single document).

20 Claims, 7 Drawing Sheets

(56) References Cited

OTHER PUBLICATIONS

Afroz, S., Brennan, M., & Greenstadt, R. (May 2012). Detecting hoaxes, frauds, and deception in writing style online. In Security and Privacy (SP), 2012 IEEE Symposium on (pp. 461-475). IEEE.
Bagnall, D. (2016). Authorship clustering using multi-headed recurrent neural networks. arXiv preprint arXiv:1608.04485.
Hochreiter, S., & Schmidhuber, J. (1997). Long short-term memory. Neural computation, 9(8), 1735-1780.
Kincaid, J. P., Fishbume Jr, R. P., Rogers, R. L., & Chissom, B. S. (1975). Derivation of new readability formulas (automated readability index, fog count and flesch reading ease formula) for navy enlisted personnel (No. RBR-8-75). Naval Technical Training Command Millington TN Research Branch.
Kuznetsov, M., Motrenko, A., Kuznetsova, R., & Strijov, V. (2016). Methods for Intrinsic Plagiarism Detection and Author Diarization. In CLEF (Working Notes) (pp. 912-919).
PAN @ CLEF 2017 (2017). Author Identification. Retrieved from the internet Feb. 15, 2018 from <https://web.archive.org/web/20170815232256/http://pan.webis.de/clef17/pan17-web/author-identification.html>.
Remy, P. (2017). Financial News Dataset from Bloomberg and Reuters. Created Aug. 23, 2016. Retrieved from the internet Feb. 15, 2018 at <https://github.com/philipperemy/financial-news-dataset>.
Scaiano, M., & Inkpen, D. (Jun. 2012). Getting more from segmentation evaluation. In Proceedings of the 2012 conference of the north american chapter of the association for computational linguistics: Human language technologies (pp. 362-366). Association for Computational Linguistics.
Sittar, A., Iqbal, H. R., & Nawab, R. M. A. (2016). Author Diarization Using Cluster-Distance Approach. In CLEF (Working Notes) (pp. 1000-1007).
Wikipedia contributors. (2018). Precision and Recall. Wikipedia, The Free Encyclopedia. Retrieved Feb. 15, 2018 from <https://en.wikipedia.org/w/index.php?title=Precision_and_recall&oldid=825280501>. 6 pages.

* cited by examiner

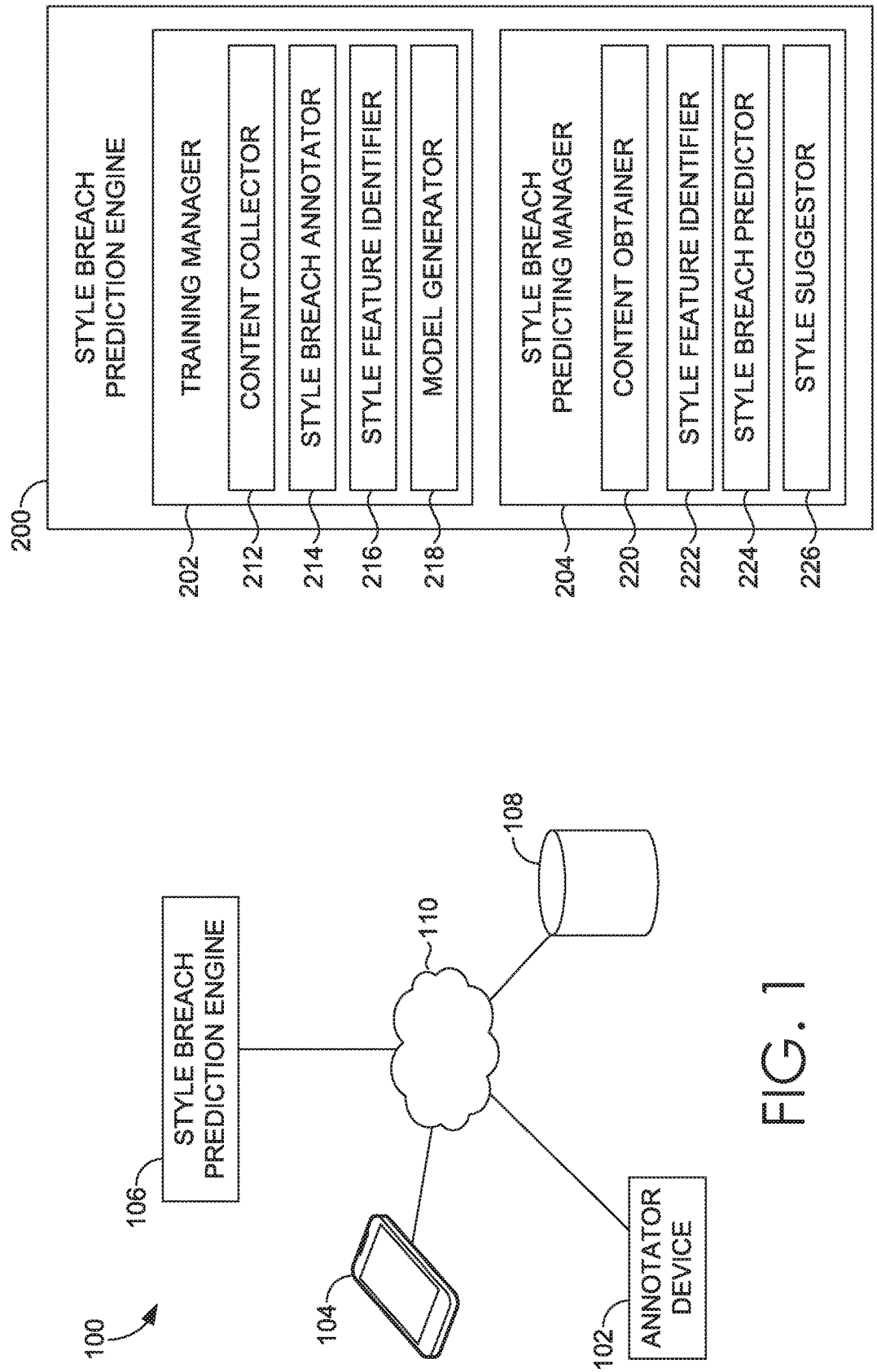

COLLABORATIVE DOCUMENTS

MENU

Problem-188.Txt (302)

Things like this should be carried on your person or packed in a carry-on bag that will fit under the seat.

Problem-186.Txt (304)

The Martha Stewart Case Timeline Below is a comprehensive timeline of happenings from the day Martha sold her ImClone stock to the Present.

Problem-13.Txt (306)

Things like this should be carried on your person or packed in a carry-on bag that will fit under the seat.

Problem-59.Txt (308)

Diabetes affects almost 24 million Americans and people may be at risk and not know it. With proper care from your diabetes team and yourself, this disease, unlike many other diseases, may be managed and complications can be reduced, delayed or even prevented. People living with diabetes may require daily insulin therapy depending on the type of diabetes a person has and how well his body can able to process insulin.

Problem-87.Txt (310)

Public Lighting Photo panels can help to carry light to rural places for the purpose of lighting public spaces.

Problem-86.Txt (312)

Solar Panels In Our Lives With the rapid depletion of traditional fossil fuels in the form of crude oil, natural gas and coal, many nations are starting to look towards alternative energy solutions.

Problem-39.Txt (314)

Birmabright was used for the bodywork as it was more readily available than steel at that time.

Problem-119.Txt (322)

"Hayward" is a female Variety of A. deliciosa var.

Problem-139.Txt (316)

The Nissan Titan was introduced in 2004, as Nissan's entry into the full-sized pickup truck market.

Problem-170.Txt (318)

Uranus is similar in composition to Neptune, and both have different compositions from the larger gas giants Jupiter and Saturn.

Problem-90.Txt (320)

An annuity is a series of income payments made at regular intervals by an insurance company in return for a premium or premiums you have paid.

Problem-47.Txt (324)

More employers are beginning to realize that their success and growth depend, more than ever, on teamwork, collaboration, diverse views, new and fresh perspectives, and creative innovation.

430 easier for them to pop open. If you plan to check any electrical equipment, glassware, small appliances, pottery, typewriters, musical instruments or other fragile items, they should be packed in a container specifically designed to survive rough handling*prefereably a factory-sealed carton or a padded hard- shell carryingcase. except for toiletries and medicinetotaling no more than 75 ounces, it is illegal and extremelydangerous to carry on board or check in your luggage any of thefollowing hazardous materials:* Aerosols: Polishes, waxes,degreasers, cleaners, etc. * Corrosives: Acids, cleaners, wet cellbatteries, etc. * Flammables: Paints, thinners, lighter fluid,liquid reservoir lighters, cleaners, adhesives, camp stoves orportable gas equipment with fuel, etc. * Explosives: Fireworks, flares, signal devices, loaded firearms, gunpowder, etc. (Smallarms ammunition for personal use may be transported in checkedluggage if it is securely packed in material designed for thatpurpose. These may not be placed in carry-on baggage.) *Radioactives: Betascopes, radiopharmaceuticals, uninstalledpacemakers, etc. * Compressed gases: Tear gas or protective-typesprays, oxygen cylinders, divers' tanks (unless they're empty), etc. * Infectious substances * Poisonous materials: Rat poison,etc.  } 432

During air travel blood coagulability rises steadily and blood flow slows down, especially in the lower legs. About 3% of air travelers develop clots, usually painlessly, but some clots cause pain and swelling. If a clottravels to the lung it can cause pain, fainting and death. A clotin the leg is called deep vein thrombosis, DVT. A clot in the lungis pulmonary embolism, PE. Clots also form in the arterial systemand in the heart, leading to heart failure and stroke. Injuries are easily avoided by simple steps such as flexing the legs frequently,and many airlines have begun telling passengers aboutthis. Frequen leg flexing is thebest preventive for ECS. The blood needs to be pushed through theone-way valve system in the veins by contractions of the large muscles. Do it fives times or more, firmly and deliberately but not strenuously. If you are bothering your seat mates, you are doing ittoo vigorously. The UK Department of Health recommends 30 minuteintervals, more frequently if you have risk factors such asathletic training or a history of DVT. } 434

[ Detect Breaches ] — 436     [ Suggest Changes ] — 438

FIG. 4

PREDICTING STYLE BREACHES WITHIN TEXTUAL CONTENT

BACKGROUND

Oftentimes, content created by different authors is aggregated together in a single document. Generally, however, the content portions created by different authors contain different writing styles, such as, for example, different choices of words, grammar style, and/or punctuation style. For instance, text written by one author can be stylistically different than text written by another author. Accordingly, aggregating content portions created by different authors oftentimes results in an inconsistent style being used throughout the document and thereby results in patchy or difficult to read content.

In many cases, it may be desirable to produce a multi-authored document that reads fluidly, that is, maintains a consistent style throughout the document. To maintain style consistency within a document, a user can manually review the content to recognize and correct any identified style inconsistencies. Such manual detection and correction, however, is tedious and time-consuming. Further, manually detecting and correcting style breaches may result in inaccurate and/or incomplete style consistency. Even using tools that identify grammatical errors or difficult-to-read sentences do not detect style inconsistencies and ensure that a consistent style is used throughout a document.

SUMMARY

Embodiments of the present invention relate to methods, systems, and computer readable media for facilitating style breach prediction within textual content. That is, style breaches, or changes in style, within content are predicted. Advantageously, detecting style breaches enables modification of the content to obtain a consistent style. To predict style breaches, embodiments described herein facilitate generating style breach prediction models using training content. In particular, the training content can be analyzed to automatically identify style features associated with the content. In addition, style breach annotations (e.g., provided by individuals assessing the content) can be obtained. Based on the style features and style breach annotations, style breach prediction models can be trained. Such style breach prediction models can then be used to predict style breaches in association with new or target content. For instance, target content can be analyzed to identify style features. The style breach prediction model can then use the identified style features to predict various style breaches within the content.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 1 is a schematic depiction of a system for facilitating style breach prediction, in accordance with embodiments of the present invention;

FIG. 2 is a depiction of a style breach detection engine, in accordance with embodiments of the present invention;

FIG. 3 is a user interface display showing various input content options, in accordance with embodiments of the present invention;

FIG. 4 is a user display interface illustrating a representation of a style breach, according to an example embodiment;

DETAILED DESCRIPTION

Figure 5:
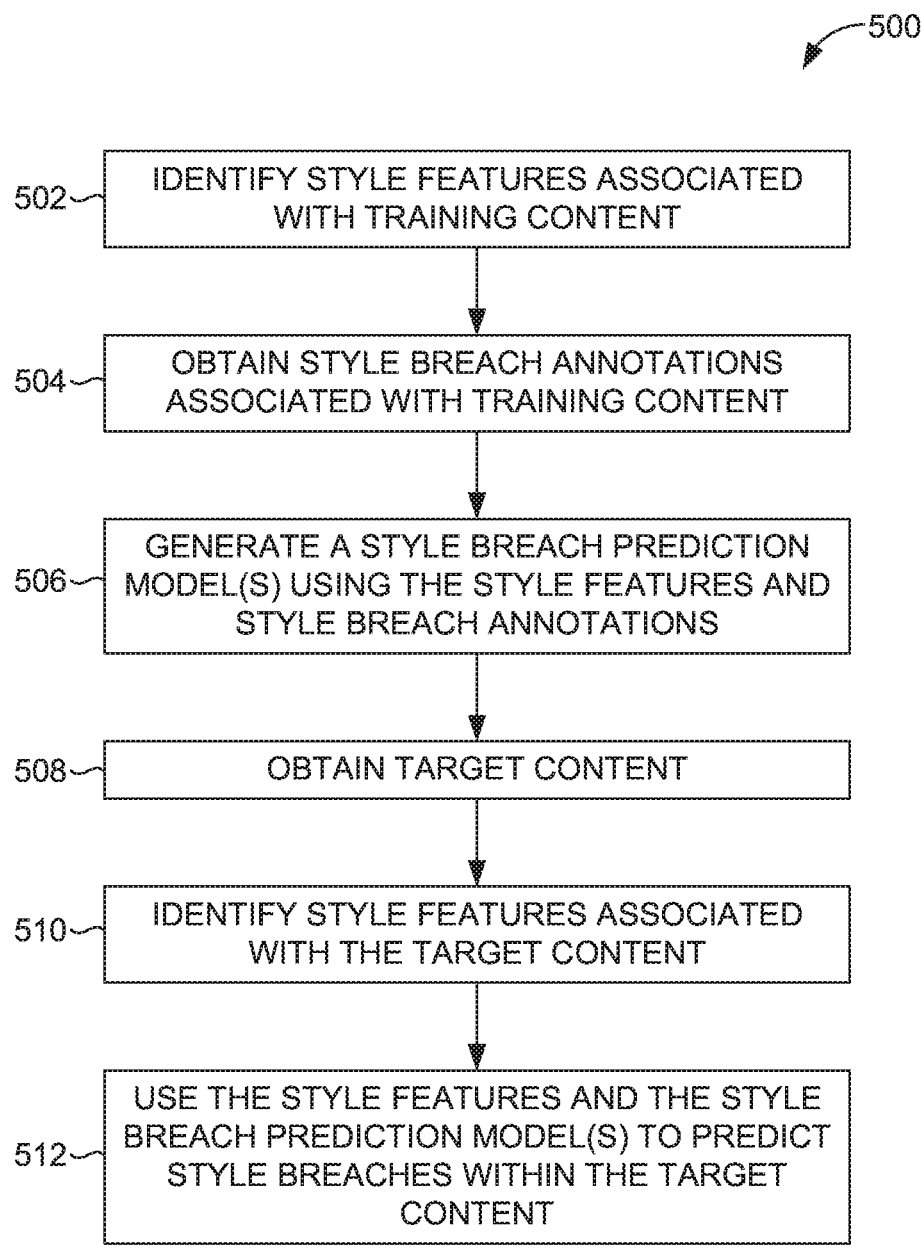
FIG. 5 is a flow diagram showing a method for facilitating style breach prediction, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Content, such as an electronic document, is oftentimes assembled via content portions created by different individuals or authors and/or created at different points in time. By way of example, such multi-authored content may be created via collaborative writing, composition of existing content from different authors, or composition of content from the same author generated at different points in time. Generally, the content portions provided by different authors contain different styles, such as, for example, different choices of words, grammar style, and/or punctuation style. For instance, as an obvious example, text written by Shakespeare is generally drastically different than text written by a more contemporary author. Even among contemporary authors, there remains differences in writing styles. As such, aggregating content portions created by different authors oftentimes results in an inconsistent style being used and thereby results in patchy or difficult to read content.

In an effort to maintain style consistency within content, a user can manually review the content to recognize and correct any identified style inconsistencies. Such manual detection and correction, however, is tedious and time-consuming. The amount of time to identify and correct style inconsistencies can be amplified as the number of authors increases and/or the amount of content increases. Further, manually detecting and correcting style breaches may oftentimes result in inaccurate and/or incomplete style consistency. Even using tools that identify grammatical errors or difficult-to-read sentences do not detect style inconsistencies and ensure a consistent style used throughout a document.

Some automated approaches pertaining to analyzing content have been attempted. For example, one approach can cluster documents written by different authors. Such an approach, however, assumes a single document is written by one author. Another content-analysis approach can cluster sentences based on topic changes. Such content-analysis approaches, however, fail to detect style breaches within content, such as a document.

Accordingly, embodiments described herein are directed to automatically detecting style breaches within content, and in particular multi-authored content. A style breach, as used herein, generally refers to a change in style or different use of style within text content. A style breach typically occurs when a different author writes content. Detecting style breaches within content enables style consistency to be maintained across content. In this regard, content assembled from multiple fragments of various documents and/or content collaboratively authored/edited can achieve a consistent style throughout the content. Generally, as used herein, a style or writing style refers to a technique or a manner in which an author writes, for example, related to utilization of syntax, punctuation, word choice, grammar, and/or tone. To this end, a particular style of content is often content that is or appears authored by a single author.

To detect style breaches within content, the content can be analyzed to identify style features associated with the content. Style features may include various features used to predict style breaches, such as lexical features and syntactic features. Advantageously, in embodiments, syntactic features can be utilized to identify style breaches irrespective of the topic or subject matter of the content. To this end, a single subject or topic may be covered in a single multi-authored content, but the style breaches can still be detected. The identified style features can be used in association with a style breach prediction model(s) to predict corresponding style breaches within the content.

Style breach prediction models can be generated using training content. In particular, training content can be analyzed to identify style features, such as lexical features and syntactic features. The content can also be analyzed by individuals, referred to herein as annotators, that view the content and provide style breach annotations, or feedback, as to perceived or known style breaches within the content. The style features and provided annotations can then be used to generate style breach prediction models. Utilizing such style breach prediction models can enable automated and efficient style breach prediction.

Importantly, because style breaches are detected within content, embodiments described herein analyze the content in a content segment manner. To this end, the content is parsed or divided into various content segments (e.g., sentences or other portion of the content) and analyzed at the segment level. The style breach prediction model can learn style from previously analyzed segments within the content and, thereafter predict whether a style breach occurs at a certain content segment. As such, advantageously, when a document is collaboratively authored, segments, such as sentences or sentence boundaries, at which the style changes can be detected.

In accordance with some embodiments described herein, upon detecting style breaches, the style breaches can be visually presented to a user such that the user can modify the content to produce a consistent style throughout. In some cases, a style modification recommendation(s) for a segment or set of segments may be generated and provided to a user. For example, a user may be provided with a recommendation of the type of style change that should be applied to ensure consistency. For instance, a recommendation to "reduce the sentence length" may be provided. As another example, a recommendation of a specific style change to apply may be suggested. For instance, a recommendation to remove a particular phrase (e.g., a prepositional phrase) may be suggested to reduce the sentence length. In yet other cases, style recommendations may be automatically implemented to generate content with a consistent style throughout.

Turning now to FIG. 1, a schematic depiction is provided illustrating an exemplary system 100 in which some embodiments of the present invention may be employed. Among other components not shown, the environment 100 may include annotator device 102, user device 104, style breach prediction engine 106, and a data store 108. It should be understood that the system 100 shown in FIG. 1 is an example of one suitable computing system. Any of the components shown in FIG. 1 may be implemented via any type of computing device, such as computing device 800 described with reference to FIG. 8, for example. The components may communicate with each other via one or more networks 110, which may include, without limitation, one or more local area networks (LANs) and/or wide area networks (WANs). Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, system 100 facilitates detecting style breaches within textual content, such as multi-authored content. As described, content or textual content refers to electronic content including at least a portion of text, such as a document, webpage, or the like. Content is multi-authored, or collaborative, when multiple individuals or authors contribute to text provided within the content. A style breach refers to a breach or difference in style. Accordingly, a style breach may be detected in a multi-authored content when the style of text associated with one author changes to a style of text associated with another author contributing to the document.

At a high level, to detect style breaches within content, textual content is analyzed to identify or detect various style features. Based on the style features, a style breach prediction model can be generated. The style breach prediction model can then be used to assess target content, or new content (e.g., an article or document), to predict or detect style breaches associated with such content. In this regard, a prediction of an extent, measure, or existence of style breach might be determined. Accordingly, a user, such as an author, marketer, or publisher, can be provided with predicted style breaches associated with the content. Further, various recommendations or suggestions can be provided in an effort to achieve or attain stylistically consistent content. In this way, suggestions may be provided to modify text resulting in an increased level of consistency of text within the content.

By way of example, and with brief reference to FIG. 4, assume a user, such as a publisher, inputs textual content 430 for style breach prediction. In such a case, an indication of style breaches can be provided to reflect different styles associated with the content. As shown in FIG. 4, a first content portion 432 is shown in a first color or shade indicating the first content portion 432 is predicted as written or prepared in one style. Further, a second content portion 434 is shown in a second color or shade indicating the second content portion 434 is predicted as written or prepared in another style. The user (e.g., publisher) can utilize such information to understand the portions of the content reflecting different styles. Further, various suggestions (not shown) can be provided to recommend or suggest a manner(s) in which to modify the text to provide a consistent style. By way of example only, various suggestions may be provided to modify the second content portion 434 to reflect the same style as the first content portion 432, or vice versa.

Returning to FIG. 1, in operation, the annotator device 102 and user device 104 can access the style breach prediction engine 106 over a network 110 (e.g., a LAN or the Internet). For instance, the annotator device 102 and user device 104 may provide and/or receive data from the style breach prediction engine 106 via the network 110. Network 110 may include multiple networks, or a network of networks, but is shown in simple form so as not to obscure aspects of the present disclosure. By way of example, network 110 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 110 is not described in significant detail.

An annotator device, such as annotator device 102, may be any computing device that is capable of presenting content to an annotator, for example, via a web browser or application installed thereon. In particular, and in accordance with embodiments described herein, annotator device 102 presents training content to annotators to obtain style breach annotations or labels associated with training content. Training content refers to textual content that is analyzed and used to train a style breach prediction model(s). In response to viewing training content at the annotator device 102, an annotator can provide annotations or labels associated with the content to indicate style breaches perceived from the content. For example, an annotator can provide an indication of a location or position within content at which a style changes.

Style breach annotations or labels can be provided in any manner (e.g., annotator selection or input). As one example, multi-authored content can be tagged with an indication of an author (e.g., specific or general identification of the author) for a particular content portion. In such an example, indicating specific portions of the content corresponding with the multiple authors can represent the style breaches. As another example, an annotator can review the content, identify stylistic changes, and provide tags or indicators (e.g., via a user selection) associated with the identified stylistic changes. A style breach annotation can be denoted in any number of ways, such as, for example, utilization of text (e.g., label with an author ID or "style breach"), a breach score (e.g., a score between 1 to 5 indicating an extent of breach detected by the annotator), a breach level (e.g., a high/medium/low level of a particular identified style breach), numerals or characters indicating points at which the author and/or style changes, or the like. For instance, a user may select various points on the content at which the style is identified as changed (e.g., based on a different style or a different author).

The annotator device 102 may be operated by any user that annotates style breaches in association with various content. While only one annotator device 102 is illustrated in FIG. 1, multiple annotator devices associated with any number of annotators may be utilized to carry out embodiments described herein. The annotator device 102 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the annotator device 102 may include one or more processors, and one or more computer-readable media. The computer-readable media may include computer-readable instructions executable by the one or more processors.

A user device, such as user device 104, may be any computing device that is capable of facilitating a user to provide content that may be analyzed to identify or predict style breaches associated with the content. For example, a user may provide content to the style breach prediction engine 106 via a browser or application installed on the user device 104. The user device 104 may be used to provide training content and/or target content. Training content is content used to train a style breach prediction model. Target content is content for which style breach detection is desired. Further, any type of user interface may be used to provide such content. In some cases, a user may input the content, for example, by typing or copying/pasting content. In other cases, content may be input by providing or inputting a reference to such content (e.g., a link, a URL, or pointer to content).

In some cases, the user device 104 accesses the style breach detection engine 106 via a web browser, terminal, or standalone PC application operable on the user device. User device 104 might be operated by an administrator, which may be an individual(s) that manages content associated with a document, a website, an application, or the like. For instance, a user may be any individual, such as an author or publisher, associated with an entity publishing the content (e.g., via the Internet). While only one user device 104 is illustrated in FIG. 1, multiple user devices associated with any number of users may be utilized to carry out embodiments described herein. The user device 104 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the user device 104 may include one or more processors, and one or more computer-readable media. The computer-readable media may include computer-readable instructions executable by the one or more processors.

The data store 108 includes data used to facilitate style breach detection. As described in more detail below, the data store 108 may include content data, such as textual content and/or metadata associated therewith, and/or style feature data. The data store 108 may also include style breach data, such as style breach annotations. Such content data, style feature data, and style breach data may be stored in the data store 108 and accessible to any component of the system 100. The data may also be updated at any time. In embodiments, the style breach data, or portion thereof, is updated dynamically or, in real-time, as an annotator reviews additional training content or at any point when data changes.

The style breach prediction engine 106 is generally configured to detect and/or predict style breaches associated with content. At a high-level, the style breach prediction engine 106 generates style breach prediction models using training content. In particular, the style breach prediction engine 106 can obtain and analyze training content to generate one or more style breach prediction models. The style breach prediction model(s) can then be utilized to predict or detect style breaches in association with target content. Predicted style breaches can be provided to a user, such as an author or publisher.

An exemplary style breach prediction engine is provided in FIG. 2. As shown in FIG. 2, a style breach prediction engine 200 includes a training manager 202 and a style breach predicting manager 204. The training manager 202 generally facilitates training a style breach prediction model(s), and the style breach predicting manager 204 utilizes the style breach prediction model(s) to predict style breaches. Although illustrated as separate components of the style breach prediction engine 200, any number of components can be used to perform the functionality described herein. Further, although illustrated as being a part of a style breach prediction engine, the components can be distributed via any number of devices. For example, a training manager can be provided via one device, server, or cluster of servers, while the style breach predicting manager can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As described, the training manager 202 is generally configured to generate and train style breach prediction models. A training manager 202 may include a content collector 212, a style breach annotator 214, a style feature identifier 216, and a model generator 218. Although illustrated as separate components of the training manager 202, any number of components can be used to perform the functionality described herein.

The content collector 212 is configured to collect or obtain content. In particular, the content collector 110 collects training content. As described, training content refers to content, typically textual content, from which prediction models are trained. Training content is not exclusive to target content in that target content can also be used as training content.

Content can be collected or obtained in any manner. In some cases, training content is provided by a user of the style breach prediction engine, such as an author or publisher. In this regard, an author or set of authors might enter or input content, for example, via a website accessible by way of a browser or an application. As an example, an author might enter or select content via user device 104 of FIG. 1 that is connected to the network 110. For instance, an author might select or provide content, for example, from a document or a webpage. In some cases, the content collected includes multi-authored content. In other cases, the content is exclusively multi-authored content.

Additionally or alternatively, a web crawler may be used to collect content, such as articles from websites or web pages. In this regard, the content collector 212 can crawl, or utilize a web crawler to crawl, various sources to identify training content that can be used in training style breach prediction models. Such content may include or only include multi-authored content. The identified content can be stored, for example, in a data store (e.g., data store 108 of FIG. 1).

The style breach annotator 214 is configured to collect style breach annotations associated with content. The style breach annotator 214 can collect style breach annotations in association with various training content. In some cases, human annotators can be used to label or annotate training content via annotator devices, such as annotator device 102 of FIG. 1. In this regard, annotators may indicate, and/or score, identified style breaches of given content or documents. For example, an annotator can indicate or label a particular location within a document as a style breach. In this regard, an annotator might indicate between sentences, or within a sentence, where a style is changing. Such an indication may be annotated or represented as a label indicating a style change. The annotation or representation may be denoted in any number of ways, such as, for example, indicating a style breach position via a character position or set of character positions. By way of example only, assume an annotator marks a first style breach after a tenth character in content and a second style breach after a twentieth character in content. In such a case, a set of style breach annotations including a first label associated with character position 10, and a second label associated with character position 20 may be generated. As another example, a first style breach annotation may indicate characters 1-10 are associated with a first style, and a second style breach annotation may indicate characters 11-20 are associated with a second style.

As can be appreciated, style breach annotations can be captured in any number of ways. In some cases, the style breach annotations may be added to the original content to generate an annotated content that indicates style breaches. In other cases, style breach annotations may be stored separately from the training content. For example, continuing with the above example, a document separate from the training content may capture the first label (e.g., denoted by a first numeral) as a first style breach and the second label (e.g., denoted by a second numeral) as a second style breach. Further, as described above, an annotation may additionally or alternatively indicate a score or extent associated with a confidence that a style breach is indeed a style breach. For instance, a scale, such as a scale of 1 to 5, can be used by an annotator to score each identified style breach. For example, a score of "5" can indicate that the particular identified style breach is strongly present in the content, while a score of "1" can indicate that the style breach is possible. The style breach annotations obtained or collected by the style breach annotator 214 can be used as ground truth data.

The style feature identifier 216 is generally configured to identify style features associated with content. In this regard, upon obtaining or referencing content, such as collected training content, the content may be analyzed to detect style features. For example, a webpage or electronic document including content can be analyzed to detect style features associated with the content. In some cases, style features are identified in association with a content segment (e.g., sentence). To this end, a content segment may be identified within content and, thereafter, a style feature(s) is identified in association with the content segment. Alternatively, style features associated with the content may be identified or determined and, thereafter, parsed in accordance with a particular content segment.

A style feature refers to any feature or aspect associated with, or indicating, style of text within content. A style feature might be represented by a word or phrase (keyword) that describes, characterizes, or indicates an aspect of the style. For example, a style feature may refer to a term or phrase that corresponds with style. As another example, a style feature might be represented by a numeral value or other value indicating a presence or absence of a style feature. As yet another example, a style feature may be represented by a count or frequency of a feature. Style features may include, but are not limited to, lexical features and syntactic features. As can be appreciated, any type of features indicating text style can be used herein.

Lexical features generally refer to a set of features related to vocabulary usage. In this regard, lexical features are related to lexemes of word-level information. As such, in embodiments, lexical features do not take into account context of a word. Exemplary lexical features include average word length, segment or sentence length, word length frequency, readability, non-English word frequency (e.g., frequency of words not in the English dictionary), word complexity (e.g., Honore's Index, Yule's Index, and token ratio), word frequency (e.g., Hapax legomena, Hapax dislegomena), and the like.

An average word length feature refers to an average number of characters per word in a content segment, such as a sentence. A segment or sentence length refers to a number of characters in the content segment or sentence. A word length frequency refers to a number of words in the segment or sentence that are of a given length (e.g., lengths ranging from 1-15 characters).

A readability feature refers to a measure or extent of readability associated with a content segment, such as a sentence. As such, readability can be based on the quantity of words, sentences, and/or syllables in text. One method that may be used to identify a readability feature uses a Flesh-Kincaid readability score, which refers to readability ease or vocabulary level of the text in a content segment given as:

$$F = 206.835 - 84.6\left(\frac{\text{total syllables}}{\text{total words}}\right)$$

Such an equation is a function of the number of syllables in the words of the content segment relative to the number of words in the content segment. In this regard, assume a sentence contains fewer words with many syllables. In such a case, the readability score is lower.

Non-English word frequency feature generally refers to a frequency of words not in the English dictionary. In one example, a word frequency feature of frequency of words not in the English dictionary refers to a ratio of a count of words in a content segment (e.g., sentence) that are not in English dictionary to the total number of words in the content segment (e.g., sentence). In this way, the number of words in a sentence that are not present in the dictionary are counted versus the total number of words in the segment, and the non-English word frequency feature is a ratio between those numbers. As can be appreciated, for documents written in a non-English language, the English dictionary can be replaced with the corresponding language.

The word complexity feature refers to the complexity of words in a content segment (e.g., sentence). In one embodiment, the Honore's Index is used to identify the complexity of words in a content segment. Such an index computes a function of the number of words in the content segment, the frequency of the most frequent word in the content segment, and the number of unique words in the content segment. Based on these three factors as input, a richness of vocabulary is determined. As such, Honore's Index measures utilization of non-unique words in the same sentence, which is an indication of vocabulary richness. Honore's Index R is given as:

$$R = \frac{\log l}{\left(1 - \frac{f_{max}}{n}\right)}$$

wherein l is the length of the content segment in words, $f_{max}$ is the frequency of the most frequent word in the content segment, and n is the number of unique words in the content segment.

As another example, Yule's Index can be used to identify the complexity of words, or vocabulary richness, in a content segment. Such an index computes a function of the number of words in a content segment and the number of words appearing a certain number of times in the content. Yule's Index K can be represented as:

$$K = C\left(\frac{S_2 - S_1}{S_1^2}\right)$$

$$S_1 = N$$

$$S_2 = \sum_m m^2 V(m, N)$$

wherein C=1, N is the number of words in the content segment, V(m,N) is the number of words appearing m times in the text.

As yet another example of word complexity or vocabulary richness, a token ratio can be utilized. A token ratio can refer to a ratio of number of distinct words in a content segment (e.g., sentence) to the total number of words in the content segment (e.g., sentence). Although Honore's index, Yule's index, and token ratio are described separately, any combination of these methods can be used to identify the complexity of words in a content segment.

The word frequency feature generally refers to frequency of words in a content segment relative to the content. For example, Hapax legomena and Hapax dislegomena can be used to represent word frequency features. Hapax legomena refers to the number of words in a content segment, such as a sentence, that occur only once in the document. Similarly, Hapax dislegomena refers to the number of words in the sentence that occur exactly twice in the document. As can be appreciated, such a feature indicating a number of words in a content segment that occur any particular number of times (e.g., 3, 4, 5, etc.) in the content (document) can be used.

Syntactic features generally refer to a set of features related to the structure of a content segment, such as a sentence. Syntactic features generally take into account the order of words in the sentence. Exemplary syntactic features include function words, punctuation count, upper case count, POS N-grams, and the like.

Function words refer to counts of each of the function words, which can be derived from a dictionary or set of function words. Function words generally refer to words that do not contribute to the meaning of the sentence. For example, articles and pronouns are often words that do not contribute to the meaning of the sentence. For a particular function word, a number of times the particular word appears in the sentence can be identified. In some cases, a count for each function word in the content segment may be identified. In other cases, an aggregate count for the totality of function words in the content segment may be identified.

Punctuation count refers to a count of each of the punctuation marks, which can be derived from a dictionary or set of punctuation marks. As such, a list or set of punctuation marks can be referenced and, for each punctuation mark, a number of times each occurs in a content segment can be identified. In some cases, a count for each punctuation mark in the content segment may be identified. In other cases, an aggregate count for the totality of punctuation marks used in the content segment may be identified.

Upper case count refers to a count of upper case letters in a content segment. Upper case count can be an indication of parts of speech, such as nouns.

POS n-grams refer to counts of various n-grams formed by parts-of-speech (POS) tags. Counts can be identified for any number of n-grams and used as features. In some embodiments, counts are determined for n-grams ranging from one to four. To obtain a count of a POS n-gram, a part-of-speech tagger may be used. In such a case, the text can be converted into a sequence of tokens, for example, by passing the text through a tokenizer. Each token can be tagged with a part of speech using a part of speech (POS) tagger. Part of speech tagging can be applied to classify words into a part-of-speech and labeling the word accordingly (e.g., noun, proper noun, verb, adjective, pronoun, article, etc.). The part-of-speech tags can then be used to identify and count POS n-grams.

Utilizing POS n-grams enables the text to be analyzed irrespective of the subject matter of the text. That is, POS n-grams enable analysis of the syntactical structure of text rather than the topic conveyed in the text. In accordance with distinguishing between different styles incorporated into a single document, the POS n-grams provides valuable insight as to the different writing styles as opposed to different topics covered in the writing.

Any number of methods can be used to identify or collect style features. The above methods are only provided as examples of possible implementations that may be employed in accordance with embodiments of the present invention. Further, as can be appreciated, any number of style features may be obtained. In some cases, data deemed relevant or beyond a threshold or relevancy might be selected, for example, such as most valuable or important features. Further, obtaining style data might happen at any time. For instance, in some cases, style data associated with content might be obtained on a single occasion or updated as provided by an author.

The model generator 218 is generally configured to generate or train a style breach prediction model(s). The model generator 218 can utilize identified style features and style breach annotations associated with content to generate such a style breach prediction model. To this end, upon obtaining style features and style breach annotations, a model can be generated.

In some cases, to generate a style breach prediction model, a style vector(s) may be generated using the identified features. A style vector can be computed as a concatenation of the identified features, or portion of identified features, described above. In embodiments, a style vector is generated for each content segment, such as each sentence. In some cases, a content segment (e.g., sentence) may be identified within content and, thereafter, a style vector is generated in association with the sentence using style features as discussed above.

In some cases, all identified style features can be used to generate a feature vector or feature set. In other cases, style features can be selected for use in generating style breach prediction models. For instance, a reduced set of style features can be selected based on the predicted relevancy or accuracy. In this manner, dimensionality reduction can be applied to reduce the number of dimensions. In one implementation, a formed style vector or set of vectors can be input to a Principle component analysis (PCA) to reduce the number of dimensions. In this way, a maximum variance of style features can be captured while reducing the number of dimensions. By way of example only, thousands of dimensions may be reduced to 200 dimensions. The reduced feature vector can then be used train the model. Advantageously, using dimensionality reduction enables reduction of the requirement for training data by reducing the number of weights required to be learned.

In addition to generating style vectors, the model generator 218 can generate vector output that indicate style breaches. In this regard, the model generator 218 can use style breach annotations to generate vector output. Vector output can be in any number of forms, including, for example, a binary format. By way of example only, zeroes can be assigned to content segments and, upon recognizing a style breach (e.g., via a style breach annotation), ones can then be assigned to content segments until another style breach is recognized. The vector outputs can toggle between zeros and ones each instance a style breach is recognized. For instance, assume content includes five sentences. The first sentence may be associated with a vector output of zero. As a style breach annotation is not recognized in association with the second sentence, the second sentence can be associated with a vector output of zero. Now assume a style breach annotation is recognized in association with the third sentence. As such, the third sentence can be associated with a vector output of one. As a style breach annotation is not recognized in association with the fourth sentence, the fourth sentence can be associated with a vector output of one. Now assume a style breach is recognized with the fifth sentence. In such a case, the fifth sentence is associated with a vector output of zero.

The style vectors and corresponding vector outputs can be used as training data to train a style breach predicting model. In embodiments, a style breach prediction model is trained via a recurrent neural network (RNN), such as a long short-term memory (LSTM) neural network. The trained style breach prediction model can be stored for subsequent utilization to predict style breaches. Although described as the model generator 218 generating the style vectors and corresponding vector outputs, as can be appreciated, any number of components can be employed to perform such functionality. For instance, style vectors and corresponding vector outputs may be determined via the style feature identifier 216 and provided as input to the model generator 218.

In some cases, upon generating or training the style breach prediction model, test data, such as style vectors and corresponding vector outputs, may be used to evaluate the model. Any number of metrics may be used to evaluate the model, such as, for example, WindowDiff, WinF, Window-Precision, and WindowRecall. WindowDiff can be calculated as followed:

$$k = \frac{N}{2 * \text{number of segments}}$$

$$WindowDiff = \frac{1}{N-k} \sum_{i=0}^{N-k} (R_{i,i+k} \neq C_{i,i+k})$$

wherein K is the window size for evaluation, N is the number of characters in the document, $R_{i,i+k}$ is the predicted number of breaches between $i^{th}$ character and $(i+k)^{th}$ character, and $C_{i,i+k}$ is the actual number of breaches between $i^{th}$ character and $(i+k)^{th}$ character.

WindowPrecision, WindowRecall, and WindowFScore are calculated from the modified True Positives, True Negatives, False Positives, and False Negatives values calculated as follows:

$$\text{True Positives} = TP = \sum_{i=1-k}^{N} \min(R_{i,i+k}, C_{i,i+k})$$

$$\text{True Negatives} = TN = -k(k-1) + \sum_{i=1-k}^{N} (k - \max(R_{i,i+k}, C_{i,i+k}))$$

$$\text{False Positives} = FP = \sum_{i=1-k}^{N} \max(0, C_{i,i+k} - R_{i,i+k})$$

$$\text{False Negatives} = FN = \sum_{i=1-k}^{N} \max(0, R_{i,i+k} - C_{i,i+k})$$

wherein K is the window size for evaluation, N is the number of characters in the document, $R_{i,i+k}$ is the predicted number of breaches between $i^{th}$ character and $(i+k)^{th}$ character, and $C_{i,i+k}$ is the actual number of breaches between $i^{th}$ character and $(i+k)^{th}$ character.

As described, the style breach prediction manager 204 is generally configured to predict style breaches within content. A style breach prediction manager 204 may include a content obtainer 220, a style feature identifier 222, a style breach predictor 224, and a style suggestor 226. Although illustrated as separate components of the style breach prediction manager 204, any number of components can be used to perform the functionality described herein.

The content obtainer 220 is configured to obtain content, such as target content, for style breach prediction. In this regard, content is obtained for which a prediction of style breach is desired. Content can be collected or obtained in any manner. In some cases, target content is provided by a user of the style breach prediction engine, such as an author. In this regard, an author or publisher might enter or input content, for example, via a website accessible by way of a browser or an application on marketer device 104. As an example, a marketer might enter or select content via user device 104 of FIG. 1 that is connected to the network 110.

For instance, a marketer might select or copy content, for example, from a document or a webpage for which brand personality prediction is desired. The content can then be pasted or input to a website or application associated with style breach prediction.

The style feature identifier 222 is configured to identify style features associated with the content, such as target content. The content can be analyzed to obtain content features. For example, the style feature identifier 222 can be used to identify style features within the target content such as, for instance, lexical features and syntactic features.

Style features can be identified in target content in the same or similar manner as described above with respect to the style feature identifier 216 generally described as identifying style features from training content. As such, various methods used to identify style features are not described again here. It should be noted that although described as separate components, a single component can be used to identify style features for both training content and target content. The components are only shown separately herein for explanatory purposes.

The style breach predictor 224 is configured to predict style breaches in association with the content. To predict a style breach associated with content, the trained style breach prediction model can be used. In particular, the style breach predictor 224 can utilize style features identified in association with the target content and a style breach prediction model to predict a style breach(es) associated with the content. In some cases, style features may be reduced, for example, using dimensionality reduction, as discussed above.

In embodiments, style features (e.g., in the form of a style vector) associated with a target content segment, such as a sentence, is provided as input to a style breach prediction model. The model, such as a long short term memory model, can then generate output indicating style breaches. In some case, the output may be in a binary form, represented as a zero or one. As such, for each style vector, associated with a content segment, provided as input, a zero or one label can be output by the model. An LSTM model can be advantageous as it utilizes memory and, as such, can retain information (e.g., memory of style) about previous content segments such that style breaches can be identified. In some implementations, a style breach prediction model can output a particular value, such as zero, for a set of content segments having a same style. When the style is different, or breached, the style breach prediction model can output a different value, such as one. Output values of one can then continue until another a new style vector associated with a new content segment indicates a different style, at which point a zero can again be output. Although embodiments described herein generally discuss toggling between output of a zero and one each time the style changes, any number of output values can be utilized. For example, a first segment of each new style could be labeled with a 1, while all other segments or sentences are labeled with 0s.

The predicted output vectors, such as zero and one values, can then be used to identify the corresponding style breaches in the target content. By way of example only, when the output value changes from a zero to one, a style breach can be detected at the beginning of the content segment. As another example, sequential content segments associated with a first set of a same value (e.g., zero) can be identified as corresponding with a first style or author, and sequential content segments associated with a second set of a same value (e.g., one) can be identified as corresponding with a second style or author.

A style breach prediction can be represented in any number of ways. For example, a style breach prediction may be represented using text (e.g., identification of a "style breach," etc.), numerals (e.g., likelihood of style breach, etc.), symbol (e.g., a symbol or punctuation provided at a style breach location), or emphasis (e.g., shading, highlighting, color modification, etc. to content segments associated with a same style or to indicate a style breach).

The style breach predictor 224 can provide or output style breach predictions. In this regard, in response to receiving a request for a style breach prediction, the style breach predictor 224 can provide one or more style breach predictions, for example, to a user device requesting the prediction(s). In some cases, a style breach representation may be provided in association with each style breach in the content. Further, in some embodiments, an indication of the style feature(s) (e.g., average word length) resulting in the style breach may be provided, for instance, concurrent to the style breach representation.

The style suggestor 226 can provide recommendations or suggestions to modify the content in association with a particular style. A suggestion or set of suggestions for modifying content may be based on the particular style feature(s) indicating a style breach. In some cases, modification suggestions may be automatically provided, for example, along with style breach prediction representations. In other cases, modification suggestions may be provided based on a user request. As one example, a user may request style suggestions for any style breaches or for a particular style breach. Further, in some cases, a user may provide an indication of an extent for which style suggestions are desired.

In some cases, a user may be provided with a suggestion of the type of style change that should be applied to ensure consistency. For instance, a suggestion to "reduce the sentence length" may be provided. As another example, a suggestion of a specific style change to apply may be suggested. For instance, a recommendation to remove a particular phrase (e.g., a prepositional phrase) may be suggested to reduce the sentence length. In yet other cases, style recommendations may be automatically implemented to generate content with a consistent style throughout.

By way of example only, and with reference to FIGS. 3 and 4, user interfaces are provided in which a user can provide content and view style breach predictions and modification suggestions. As shown in FIG. 3, a user may be presented with various contention options, such as target content options 302-324. The user may then input or select a target content, such as target content options 302. In embodiments, a user inputting or selecting the target content may be an individual, such as an author or publisher, associated with the content. Upon selecting the target content, the target content 430 can be presented via the display screen, as shown in FIG. 4. Assume now that a user selects to view "style breaches" 436. In such a case, the target content 430 can be modified to provide representations of the predicted style breaches. For example, an indication of style breaches can be provided to reflect different styles associated with the content. As shown in FIG. 4, a first content portion 432 is shown in a first color or shade indicating the first content portion 432 is predicted as written or prepared in one style. Further, a second content portion 434 is shown in a second color or shade indicating the second content portion 434 is predicted as written or prepared in another style. The user (e.g., publisher) can utilize such information to understand the portions of the content reflecting different styles. Further, based on a user selection of "suggest changes" 438, various suggestions (not shown) can be provided to recommend or suggest a manner(s) in which to modify the text to provide a consistent style. By way of example only, various suggestions may be provided to modify the second content portion 434 to reflect the same style as the first content portion 432, or vice versa.

Turning now to FIG. 5, a flow chart is illustrated showing an exemplary method 500 of predicting style breaches, in accordance with embodiments of the present invention. In embodiments, the method 500 is performed by a style breach prediction engine, such as style breach prediction engine 200 of FIG. 2. Initially, and as indicated at block 502, style features associated with training content are identified. Style features may include any number of features associated with or indicating the style of textual content. Style features may include, for example, lexical features and syntactic features. In some cases, the style features may be reduced in dimensionality. At block 504, style breach annotations associated with training content are obtained. Such style breach annotations can include an indication at which a style is changed in the content (e.g., as provided by a user). Thereafter, at block 506, the style features and style breach annotations are used to generate or train a style breach prediction model(s). In some embodiments, to generate or train a style breach prediction model, such as a LSTM model, a style vector representing style features is formed and used along with style breach annotations to generate output values associated with the style vector. The style vector and corresponding output value associated with a content segment can then be used to train the style breach prediction model. At block 508, a target content is obtained. Such a target content can be provided by any user, such as an author associated with or relevant to the target content. At block 510, the style features associated with the target content are identified. The style features and the style breach prediction model(s) are used to predict style breaches within the target content, as indicated at block 512.

Figure 6:
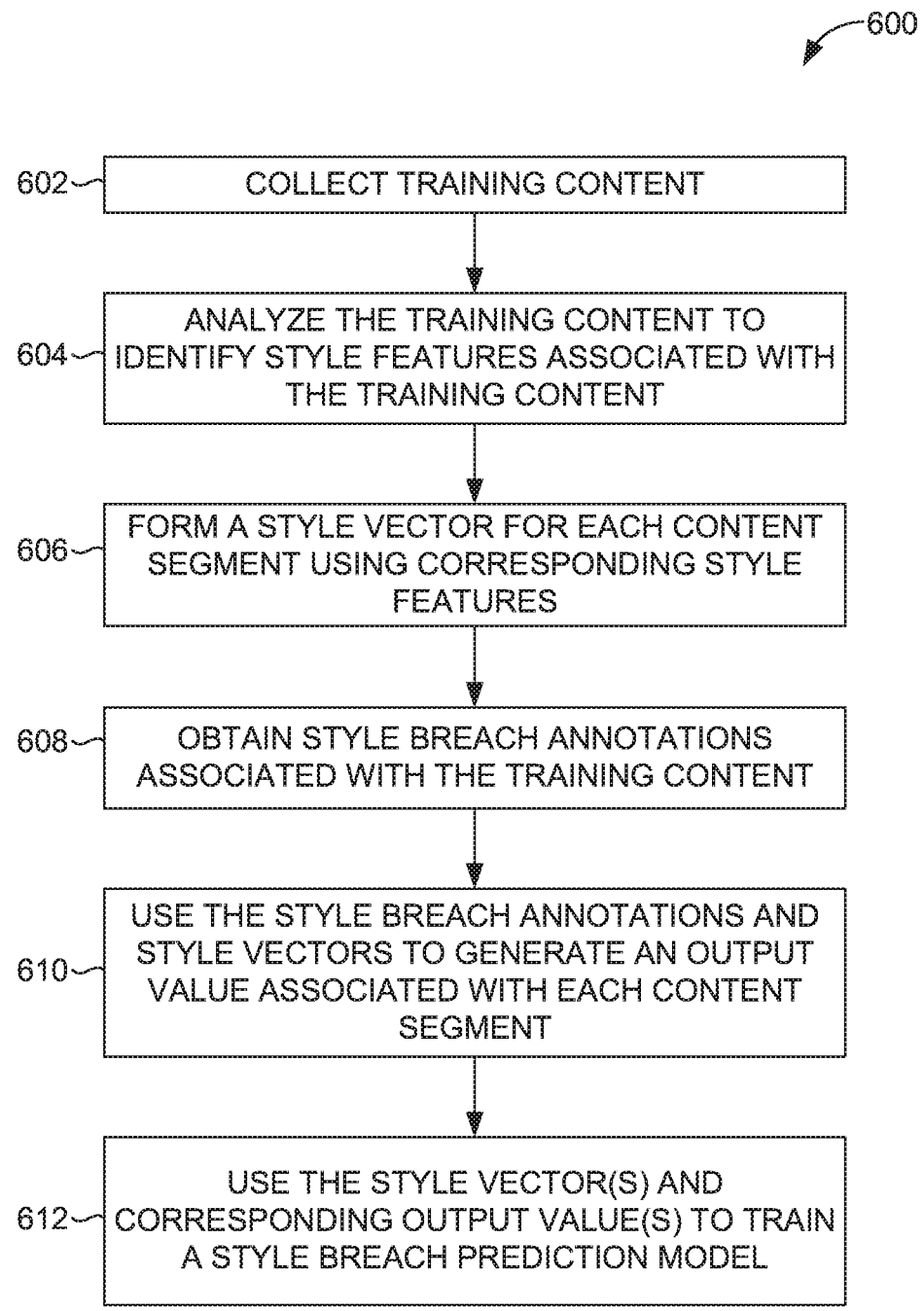
FIG. 6 is a flow diagram showing a method for generating style breach prediction models, in accordance with an embodiment of the present invention.

Referring now to FIG. 6, a flow diagram shows a method 600 for generating style breach prediction models, in accordance with embodiments of the present invention. Initially, at block 602, training content is collected. Training content can be any type of content that can be used to train a style breach prediction model. At block 604, the training content is analyzed to identify style features associated with content segments (e.g., sentences) within the training content. At block 606, a style vector is formed for each content segment using the corresponding style features. In some implementations, the style vector is reduced in dimensionality. At block 608, style breach annotations associated with the training content are obtained. The style breach annotations and style vectors are used to generate an output value associated with each content segment, as indicated at block 610. For example, output value may be a zero or one that, when transition from one value to another, indicates a style breach. The style vector(s) and corresponding output value(s) are used as a training sample to train a style breach prediction model, as indicated at block 612.

Figure 7:
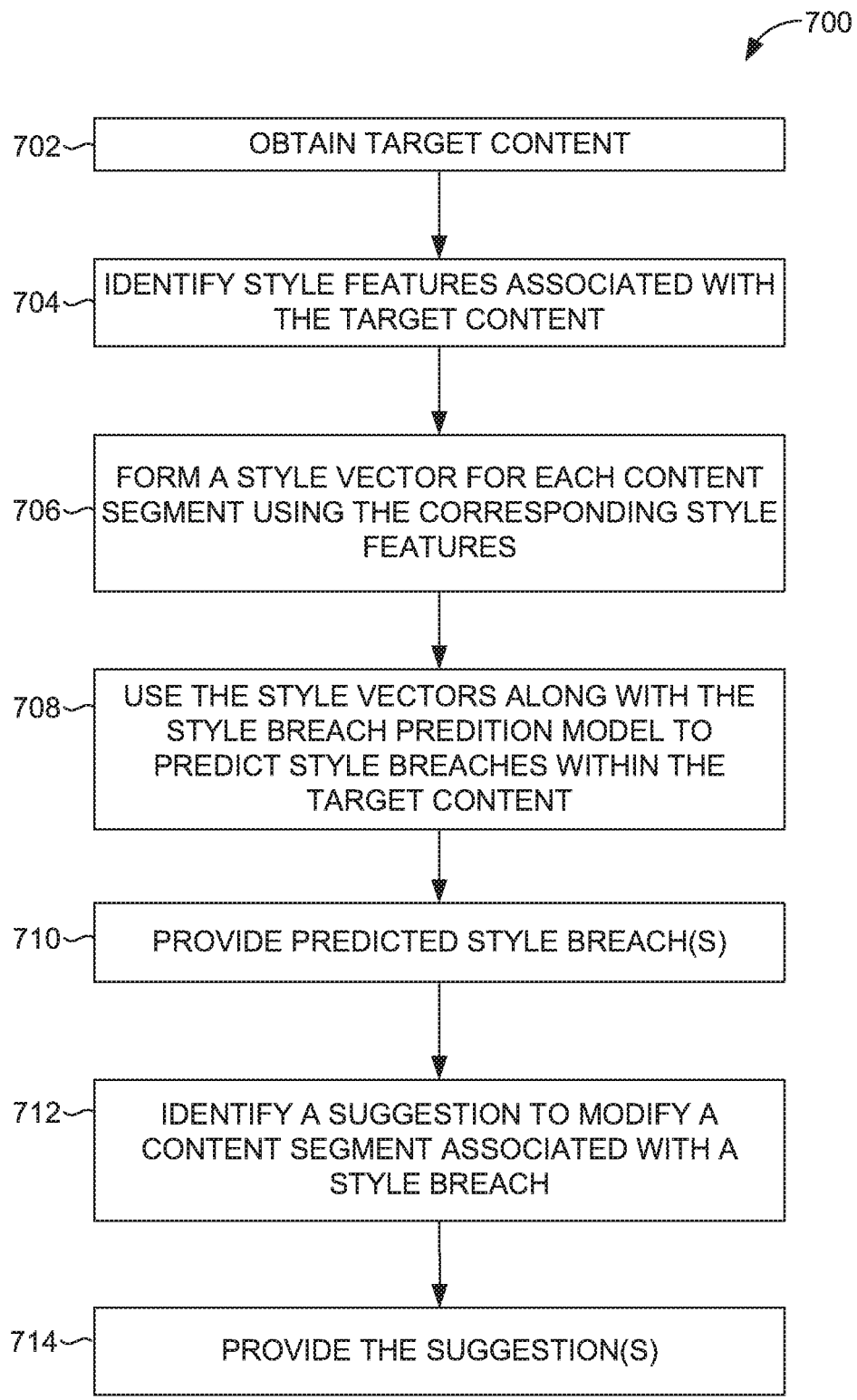
FIG. 7 is a flow diagram showing a method for predicting style breaches, in accordance with an embodiment of the present invention.

With reference now to FIG. 7, a flow diagram shows a method 700 for prediction style breaches within multi-authored content, in accordance with embodiments of the present invention. At block 702, target content is obtained. Target content can be provided by a user. Thereafter, at block 704, style features associated with the target content are identified. Style features may include any number of features associated with or indicating the style of textual content. Style features may include, for example, lexical features and syntactic features. At block 706, a style vector is formed for each content segment using the corresponding style features. The style vectors are used along with a style breach prediction model to predict style breaches within the target content, as indicated at block 708. At block 710, a predicted style breach is provided, for example, to a user requesting style breach predictions. At block 712, a suggestion(s) to modify a content segment associated with a style breach is identified. For example, a suggestion to modify the length of a content segment may be identified. At block 714, the suggestion(s) is provided, for example, to a user requesting to view style modification suggestions.

Figure 8:
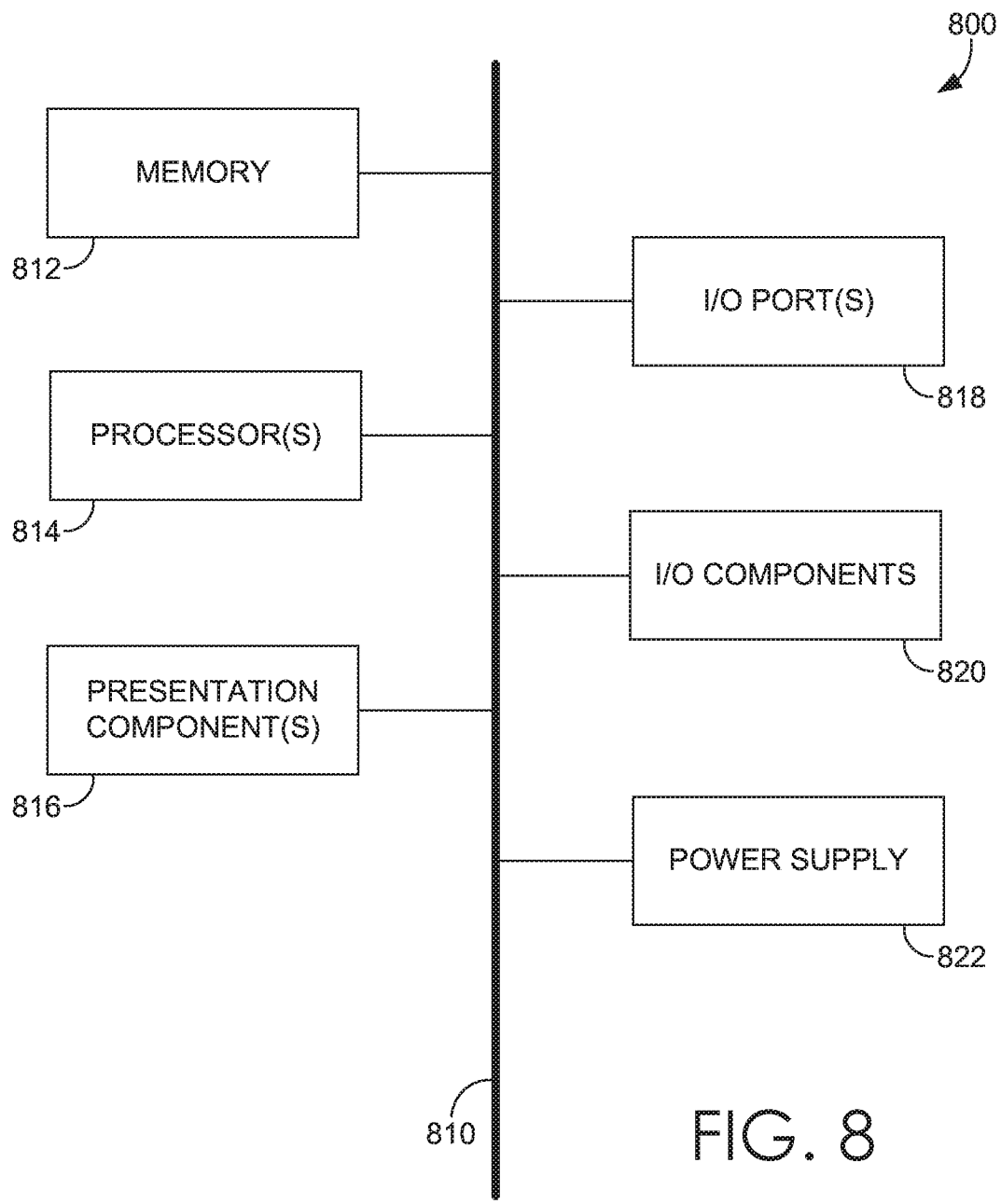
FIG. 8 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transient computer storage media storing computer-useable instructions that; when used by one or more computing devices, cause the one or more computing devices to perform operations comprising:
    obtaining target content for which style breach prediction is desired, the target content comprising content created by a plurality of individuals;
    identifying a set of style features associated with a particular content segment within the target content;
    inputting the set of style features for the particular content segment into a style prediction model;
    based on the set of style features for the particular content segment input into the style prediction model, obtaining a binary value associated with the particular content segment to indicate whether a style breach between the particular content segment and a previous content segments exists; and
    predicting a style breach indicating a change in writing style of text between the particular content segment and the previous content segment based on a determination that a binary value associated with the particular content segment is different from a binary value associated with the previous content segment.

2. The one or more non-transient computer storage media of claim 1, wherein the style features comprise lexical features.

3. The one or more non-transient computer storage media of claim 1, wherein the style features comprise syntactic features.

4. The one or more non-transient computer storage media of claim 2, wherein the lexical features comprise one or more of an average word length, a sentence length, a word length frequency, a Flesh-Kincaid readability score, a frequency of words not in the English dictionary, an Honore's Index value, a Hapax legomena value, a Hapax dislegomena value, a Yule's Index value, and a token ratio.

5. The one or more non-transient computer storage media of claim 3, wherein the syntactic features comprise one or more of a count of a function word, a punctuation count, an upper case count, and a part-of-speech n-gram.

6. The one or more non-transient computer storage media of claim 1 further comprising generating a style vector for each of the plurality of content segments, each style vector generated using the style features corresponding with the content segment.

7. The one or more non-transient computer storage media of claim 6 further comprising reducing dimensionality of the style features using a Principal Component analysis.

8. The one or more non-transient computer storage media of claim 1, wherein the style breach prediction model comprises a long short-term memory model.

9. The one or more non-transient computer storage media of claim 1 further comprising providing a representation of the style breach within the target content.

10. The one or more non-transient computer storage media of claim 1 further comprising:
    determining a modification suggestion to modify the target content for style consistency; and
    providing the modification suggestion.

11. A computerized method to facilitate style breach prediction, the method comprising:
    collecting training content having a plurality of content segments;
    identifying style features associated with each content segment of the plurality of content segments of the training content;
    obtaining style breach annotations associated with the training content, the style breach annotations indicating positions at which a style within the training content is perceived as different;
    for each content segment, generating a vector output based on the style breach annotations and the style features associated with the corresponding content segment, wherein the vector output comprises a binary value that, when different from a binary value associated with a previous content segment, indicates a style breach; and
    training a style breach prediction model based on the style features and the vector outputs generated for the content segments, the style breach prediction model configured to predict changes in text style within content.

12. The method of claim 11, wherein the content comprises multi-authored content.

13. The method of claim 11 further comprising generating a plurality of style vectors for a plurality of training content segments using the style features.

14. The method of claim 13 further comprising using the plurality of style vectors and the style breach annotations to generate output values associated with each of the plurality of style vectors, the output values indicating style breaches.

15. The method of claim 14, wherein the plurality of style vectors and corresponding output values are used as input to train the style breach prediction model.

16. The method of claim 11, wherein the style breach prediction model comprises a long short-term memory model.

17. A computer system comprising:
    a model generating means configured to generate a style breach prediction model using style features identified within training content and corresponding style breach annotations; and
    a style breach prediction means configured to predict a style breach between a particular content segment and a previous content segment based on a determination that a binary value associated with the particular content segment is different from a binary value associated with the previous content segment.

18. The system of claim 17, wherein the model generating means is further configured to identify style features associated with the training content.

19. The system of claim 17, wherein the style breach annotations are provided by annotators indicating locations in the training content at which style breaches are perceived.

20. The system of claim 17, wherein the style breach prediction means is further configured to identify style features associated with the target content, and use the identified style features along with the style breach prediction model to predict at least one style breach within the target content, wherein the style breach indicates a change in style used in the target content.

\* \* \* \* \*